(12) United States Patent
Mei et al.

(10) Patent No.: US 9,069,956 B2
(45) Date of Patent: Jun. 30, 2015

(54) METHOD FOR SCANNING FILE, CLIENT AND SERVER THEREOF

(75) Inventors: Shuhui Mei, Shenzhen (CN); Anwu Liang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/130,665

(22) PCT Filed: Jul. 9, 2012

(86) PCT No.: PCT/CN2012/078387
§ 371 (c)(1),
(2), (4) Date: Jan. 2, 2014

(87) PCT Pub. No.: WO2013/017004
PCT Pub. Date: Feb. 7, 2013

(65) Prior Publication Data
US 2014/0157408 A1    Jun. 5, 2014

(30) Foreign Application Priority Data

Aug. 4, 2011   (CN) .......................... 2011 1 0222738

(51) Int. Cl.
*H04L 29/06*    (2006.01)
*G06F 21/55*    (2013.01)
(Continued)

(52) U.S. Cl.
CPC ................ *G06F 21/55* (2013.01); *G06F 21/60* (2013.01); *H04L 63/1441* (2013.01); *G06F 21/64* (2013.01); *H04L 63/1433* (2013.01); *G06F 21/567* (2013.01)

(58) Field of Classification Search
CPC . H04L 63/1441; H04L 63/1433; G04F 21/60; G04F 21/64; G06F 21/55

USPC .......................................................... 726/22
See application file for complete search history.

(56) References Cited

U.S. PATENT DOCUMENTS 6,021,510 A  *  2/2000  Nachenberg ................ 714/38.14
6,931,548 B2 *  8/2005  O'Connor ........................ 726/22
(Continued)

FOREIGN PATENT DOCUMENTS

| CN | 101127061 B | 5/2010 |
| CN | 101808102 A | 8/2010 |
| CN | 101827096 A | 9/2010 |

OTHER PUBLICATIONS

State Intellectual Property Office (ISA/CN), "Written Opinion of the International Searching Authority", China, Sep. 6, 2012.
(Continued)

*Primary Examiner* — Michael S McNally
(74) *Attorney, Agent, or Firm* — Tim Tingkang Xia, Esq.; Morris, Manning & Martin, LLP

(57) ABSTRACT

A method for scanning files includes enumerating unscanned files; obtaining attributions of the unscanned files from the enumerated files one by one, and transmitting to a server the attributions; comparing the attributions with features that are stored in the server; obtaining the features that are consistent with the attributions and types that the features belong to; and generating a mapping relationship between the unscanned files, the attributions and the types according to the features that are consistent with the attributions and the types of the features, and recording the mapping relationship in a first scanning result. The above method uploads the attributions of the files to the server; and makes the safety and risky recognition of the file through comparing with the features and the corresponding types.

26 Claims, 9 Drawing Sheets

(51) Int. Cl.
*G06F 21/56* (2013.01)
*G06F 21/60* (2013.01)
*G06F 21/64* (2013.01)

(56) References Cited

U.S. PATENT DOCUMENTS

| | | | |
|---|---|---|---|
| 6,993,132 B2* | 1/2006 | Khandelwal et al. | 380/232 |
| 7,240,060 B2* | 7/2007 | Adya et al. | 726/9 |
| 7,475,427 B2* | 1/2009 | Palliyil et al. | 726/24 |
| 2005/0021994 A1* | 1/2005 | Barton et al. | 713/200 |
| 2007/0150948 A1* | 6/2007 | De Spiegeleer | 726/22 |
| 2008/0034434 A1* | 2/2008 | Repasi et al. | 726/24 |

OTHER PUBLICATIONS

The International Bureau of WIPO, "International Preliminary Report on Patentability", Switzerland, Feb. 4, 2014.

State Intellectual Property Office (ISA/CN), "International Search Report", China, Sep. 6, 2012.

* cited by examiner

METHOD FOR SCANNING FILE, CLIENT AND SERVER THEREOF

CROSS-REFERENCE TO RELATED APPLICATIONS

The present application is a U.S. national stage of international application No. PCT/CN2012/078387, filed Jul. 9, 2012, which claims foreign priority to Chinese application No. 201110222738.9 filed Aug. 4, 2011, which are incorporated herein by reference in their entireties.

FIELD OF THE INVENTION

The present disclosure relates generally to the field of data processing technology, and more particularly, to a method for scanning file, client and server thereof.

BACKGROUND OF THE INVENTION

With the development of the computer technology, people are enjoying working and entertainment through various files. The files people are using might have been downloaded from the internet, or have been obtained through portable storage medium, or might have been received through interconnection with other people. Accordingly, from the aspect of the users, high possibility lies that the files obtained through various ways, as well as within the terminal devices such as computers and mobile phones could be suspicious. Moreover, great harm would be caused to the files people are using through the overflow of the virus program or Trojans contained in the suspicious files.

However, only the scanning engines of the local clients and the local virus library are used in scanning the suspicious files. The client engines are anti-virus engines while the virus signature database with the local virus library is limited, as comparing to the fact that the number of virus features and Trojans are growing rapidly far more than the updating speed of the local virus library, thereby the local virus library could only improve the updating frequency very passively.

Due to the incompetency that the virus signature database of the local virus library could not cover all the virus features and Trojans, low efficiency lies when using the client engine to scan suspicious files.

SUMMARY OF THE INVENTION

Accordingly, it is necessary to provide a method for scanning files which could improve the scanning efficiency.

Besides, it is necessary to provide a system for scanning files which could improve the scanning efficiency.

Besides, it is necessary to provide a client for scanning files which could improve the scanning efficiency.

Besides, it is necessary to provide a server for scanning files which could improve the scanning efficiency.

A method for scanning files includes:
enumerating unscanned files;
obtaining attributions of the unscanned files from the enumerated files one by one, and transmitting to a server the attributions;
comparing the attributions with features that are stored in the server, obtaining the features that are consistent with the attributions and types that the features belong to; and
generating a mapping relationship between the unscanned files, the attributions and the types according to the features that are consistent with the attributions and the types of the features, and recording the mapping relationship in a first scanning result.

A method for scanning files includes:
enumerating unscanned files;
obtaining attributions of the unscanned files from the enumerated files one by one, and transmitting to a server the attributions.

A method for scanning files includes:
comparing attributions with features that are stored in a server, obtaining the features that are consistent with the attributions and types that the features belong to;
generating a mapping relationship between unscanned files, the attributions and the types according to the features that are consistent with the attributions and the types of the features, and recording the mapping relationship in a first scanning result.

A system for scanning files includes a client and a server;
the client includes:
an enumerating module for enumerating files;
an attribution obtaining module for obtaining attributions of unscanned files one by one, and transmitting to the server the attributions;
the server includes:
a database for storing features and the types of the features;
a comparison module for comparing the attribution with the features that are stored, and obtaining those features that are consistent with the attributions and the type that the features belong to;
a mapping relationship module for generating a mapping relationship between the unscanned files, the attributions and the types according to the features that are consistent with the attributions and the types of the features, and recording the mapping relationship in a first scanning result.

A client for scanning files includes:
an enumerating module for enumerating files;
an attribution obtaining module for obtaining attributions of unscanned files one by one, and transmitting to the server the attributions.

A server for scanning files includes:
a database for storing features and the types of the features;
a comparison module for comparing the attribution with the features that are stored, and obtaining those features that are consistent with the attributions and the type that the features belong to;
a mapping relationship module for generating a mapping relationship between the unscanned files, the attributions and the types according to the features that are consistent with the attributions and the types of the features, and recording the mapping relationship in a first scanning result.

The above method and system for scanning files and the client and the server upload the attributions of the files to the server; and make the safety and risky recognition of the file through comparing with the features and the corresponding types. Since the server would break the limit of the storage volume while storing large amount of features and the server could update the features quickly and timely, the features stored in the server would be relatively competent; thereby the scanning efficiency of the files could be improved.

DESCRIPTION OF THE PREFERRED EMBODIMENTS

Figure 1:
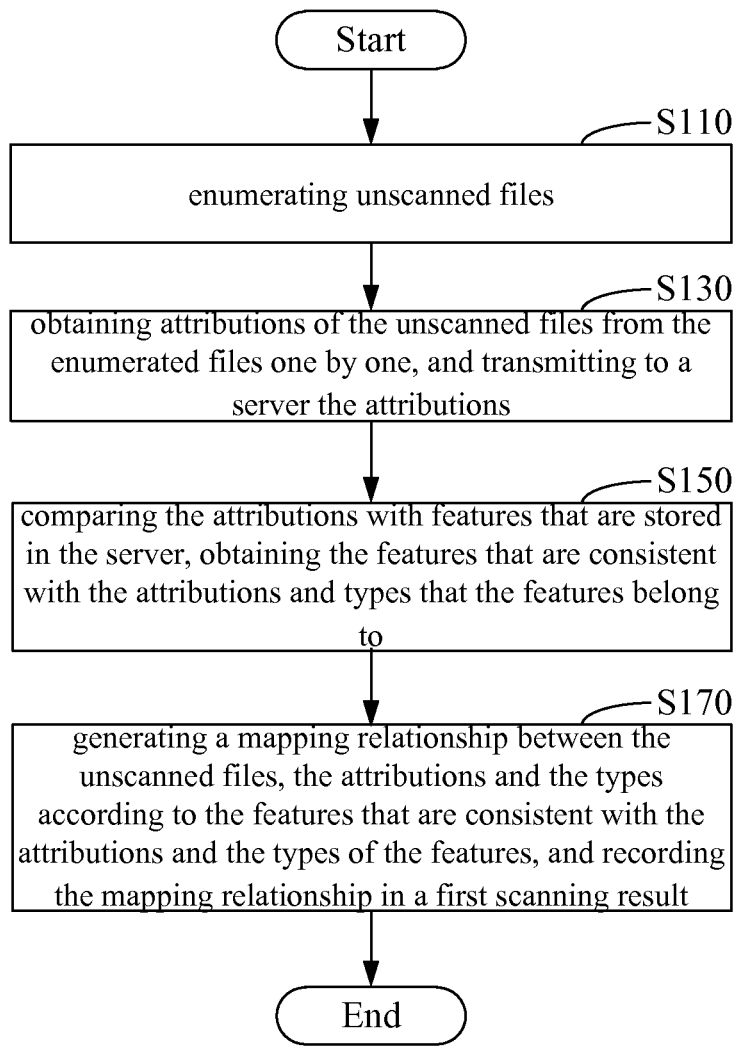
FIG. 1 is a flow diagram of a method for scanning files according to an embodiment.

FIG. 1 is a flow diagram of a method for scanning files according to an exemplary embodiment, which includes as follows.

Step S110, enumerating unscanned files.

According to the current embodiment, when launching the scanning engine of the anti-virus software or anti-Trojans software, the users create a scanning request through the scanning page of the scanning engine, and send the created scanning request to the bottom hardware of the system through an IPC (inter-process communication) module, and further send the scanning request to the server through the bottom hardware of the system. The scanning engine and the server obtain the unscanned files through the received scanning request, and thereby carry targeted scanning on the files according to the scanning request. The IPC module is set between the scanning page of the scanning engine and the bottom hardware, for conducting a communication between the scanning page and the bottom hardware, and further getting the scanning engine and the server interconnected.

In detail, the scanning request includes a task ID, scanning layer, and the way to enumerate the file folder; wherein the scanning layer is related to the options that the user chooses to make a quick scanning, a complete scanning, or a customized scanning. For example, as in the mode of quick scanning, the scanning speed is quite high while the scanning layer is relatively superficial.

For conducting the scanning of the files, the unscanned files would be obtained according to the user's operation on the scanning page. The designated files would be the unscanned files, and then are enumerated in accordance with a set queue length, distributed to be enumerated queues with particular length for the canning. In a preferred embodiment, the length of the files is 20000.

Step S130, obtaining attributions of the unscanned files one by one, and transmitting to a server the attributions.

According to the current embodiment, the attributions of the unscanned files are obtained to identify the unscanned files uniquely, and could be used for ensuring the integrity of the unscanned files. In a preferred embodiment, the attributions of the unscanned files could be MD5 value.

The attribution of each unscanned file of the enumerated multiple unscanned files is obtained one by one, to generate an inquiry request containing information such as the attribution, the file name of the unscanned file; the generated inquiry request is then sent to the server. The server could be a cloud platform constructed by multiple servers within which cloud platform the number of the servers could be added or deducted with reference to the demand, or large scale server groups.

After triggering the scanning of the server on the files, if the enumerated unscanned files to be scanned by the server are void which no unscanned file is found to be scanned by the server, a predetermined time is set and to be waited before a retry. The predetermined time could be 100 ms.

Step S150, comparing the attributions with features that are stored in the server, obtaining the features that are consistent with the attributions and types that the features belong to.

In the current embodiment, the attributions might be the MD5 values or Hash values after conducting calculations on the unscanned files, wherein each attribution is corresponding to one unscanned file uniquely. In case that the unscanned file is of no integrity, the corresponding attribution would be different from that of the integrated unscanned file. Large number of features and the belonging types are stored in the server. The stored features and the types are correlated with each other, meaning each feature has the corresponding type. It is looked up in the server according to the attributions of the unscanned files, to find those features that are consistent with the attributions, and moreover to find the type that the features belong to according to the correlation between the features and the corresponding types, wherein the found types are the types of the attributions of the unscanned files indicating that the unscanned files are normal files, virus files, or Trojans. For instant, the types that the features of the virus files belong are blacklists, those files with the blacklist types are virus files or Trojans; while the types that the features of the normal files belong are whitelists, those files with the whitelist types are determined to be safe files that don't contain viruses or Trojans and are trustworthy to run. For suspicious files, the types of which are gray list; while those files with the gray list type could not be determined as virus files or Trojans, but are active in the virus sensitive parts of the system.

Those features that are consistent with the attributions of the unscanned files are found among the comparison of the attributions with the features that are stored in the server, and further the corresponding types are determined through the features that are consistent with the attributions. The types indicate that the files corresponding to the attribution is virus files, Trojans, or normal files, or suspicious files. In case that there is not stored in the server the consistent feature in accordance with the attribution, meaning the large amount of features stored in the server are not hit, whereas the files with such attributions are classified into an undefined list.

Step S170, generating a mapping relationship between the unscanned files, the attributions and the types according to the features that are consistent with the attributions and the types of the features, and recording the mapping relationship in a first scanning result.

According to the current embodiment, the type of the file could be determined through the comparison process between the attribution and the feature, and further a first scanning result is concluded and sent to the user.

The above steps S150 and S170 are run in the server, to conducting the file scanning in the server.

Figure 2:
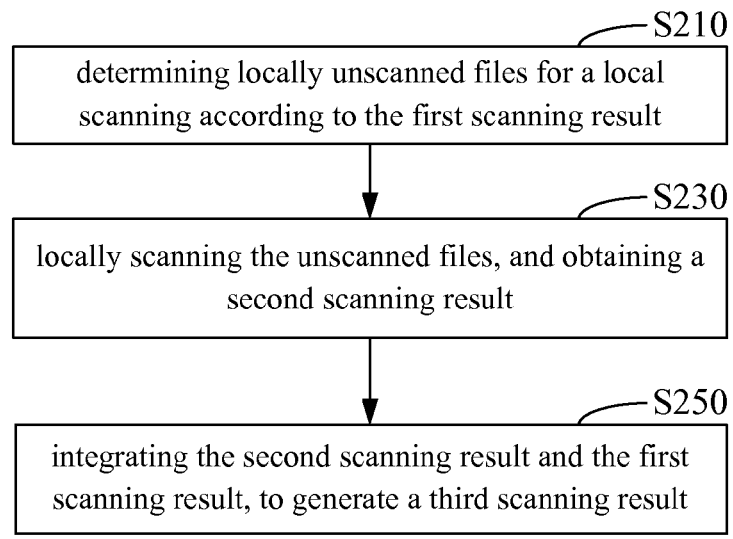
FIG. 2 is a flow diagram of a method for scanning files according to another embodiment.

According to another embodiment, as in FIG. 2, following steps are included after the step S170 as above.

Step S210, determining locally unscanned files for a local scanning according to the first scanning result.

In accordance with the current embodiment, on the basis of the scanning through the server, the files could also go through a local scanning with the scanning engine. For the improvement of the efficiency and the accuracy, the local scanning of the files shall be made with adequate combination with the file scanning in the server.

In detail, it can be determined from the first scanning result that is fed back from the server those suspicious files and those files with attributions that corresponding features could not be found in the server, wherein for ensuring the accuracy of the scanning result, it is necessary to determine the suspicious files and the files with the undefined list to be the scanning files for the local scanning.

Further, it is necessary to conduct a local scanning on those files that have not gone through the scanning in the server, thereby ensuring all the files have been scanned and obtained corresponding scanning result.

After triggering the local scanning, if the unscanned files for the local scanning are not found, a predetermined time is set to be waited before a retry. The predetermined time could be 100 ms.

Step S230, conducting a local scanning on the unscanned files, thereby obtaining a second scanning result.

According to the current embodiment, the attributions are obtained from the unscanned files, and the local virus library is looked up to find the features that are consistent with the attributions and the corresponding type according to the obtained attribution, and further, whether the files are normal files, virus files or Trojans could be determined by the found type.

Step S250, integrating the second and the first scanning result, to generate a third scanning result.

According to the current embodiment, after finished the server scanning and the local scanning, a third scanning result could be determined through the integration of the first scanning result and the second scanning result with adequate combination.

| First Scanning Result | Second Scanning Result | Third Scanning Result |
| --- | --- | --- |
| Blacklist | Blacklist | Blacklist |
| Blacklist | Whitelist | Blacklist |
| Blacklist | Undefined | Blacklist |
| Whitelist | Blacklist | Whitelist |
| Whitelist | Whitelist | Whitelist |
| Whitelist | Undefined | Whitelist |
| Gray List | Blacklist | Blacklist |
| Gray List | Whitelist | Whitelist |
| Gray List | Gray List | Gray List |
| Undefined | Blacklist | Blacklist |
| Undefined | Whitelist | Whitelist |
| Undefined | Gray List | Gray List |

In detail, as in the above table, for a given file, if the first scanning result determines that the file type is blacklist, the third scanning result thereof would be consistent with the first scanning result; if the first scanning result determines that the file type is gray list or undefined, it is needed to obtain a second scanning result through a local scanning, and the third scanning result thereof would be determined in consistent with the second scanning result.

According to the above scanning method, the third scanning result could be illustrated to the user after being generated; reminders to the user shall be proposed regarding the risk of the blacklist files according to the third scanning result, and further a clear operation could be made on those blacklist files.

Figure 3:
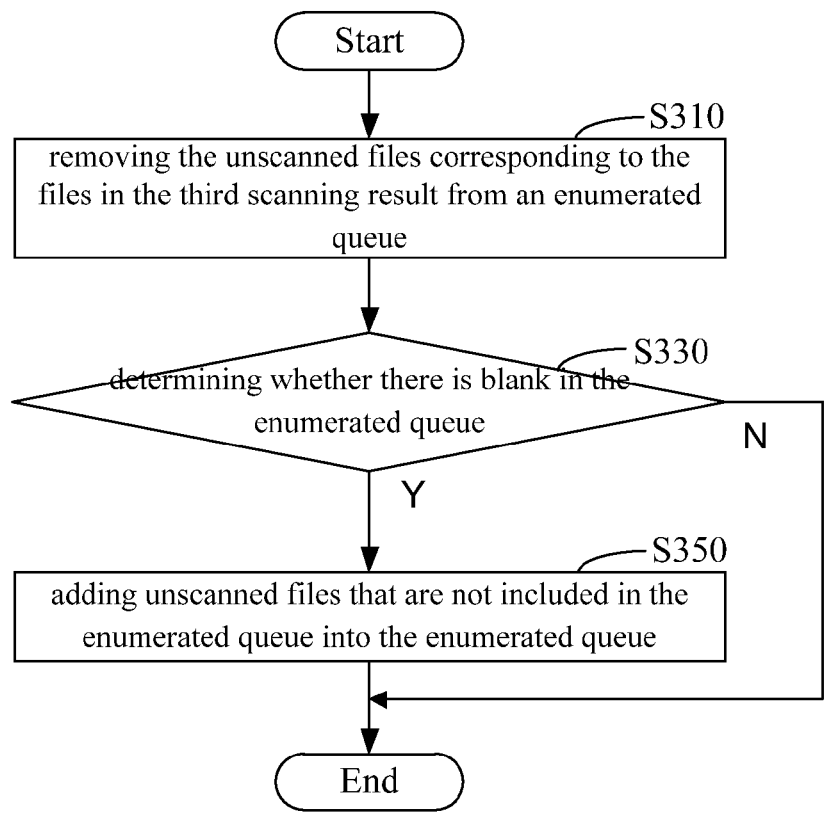
FIG. 3 is a flow diagram of a method for scanning files according to another embodiment.

In accordance with another embodiment, with reference to FIG. 3, the following steps might be included after the above step S250.

Step S310, removing the unscanned files corresponding to the files in the third scanning result from the enumerated queue.

In the present embodiment, after the server scanning and the local scanning on the files, it shall be removed those files that have gone through the scanning from the enumerated queues; which means the files are addressed according to the file options in the third scanning result, and then removed from the enumerated multiple scanning files.

Step S330, determining whether there is blank in the enumerated queue, step S350 is followed if there is blank, while goes to the end if no.

According to the present embodiment, not all the unscanned files are within the enumerated queue since the enumerated multiple files shall form the enumerated queue with a particular length, therefore it is necessary to find the blank in the enumerated queue so that those files that have not been included in the enumerated queue could be added into the enumerated queue.

In detail, after removing the files that have been scanned, the unscanned files in the enumerated queue would remain the original positions while would not be moved or adjusted even particular files have been removed. For instance, if a file in the first position in the enumerated queue is removed from the enumerated queue after being scanned, the file in the second position would not move forward to supplement the blank in the first position. Accordingly, an enumerating pointer in the enumerated queue would start to search for the blank from the first position, while a blank is found, an unscanned file which is not included in the enumerated queue and waiting for being scanned would be added into the enumerated queue. In case no blank is found, a continued search is gone through for adding the unscanned file into the enumerated queue.

Step S350, adding unscanned files that are not included in the enumerated queue into the enumerated queue.

Figure 4:
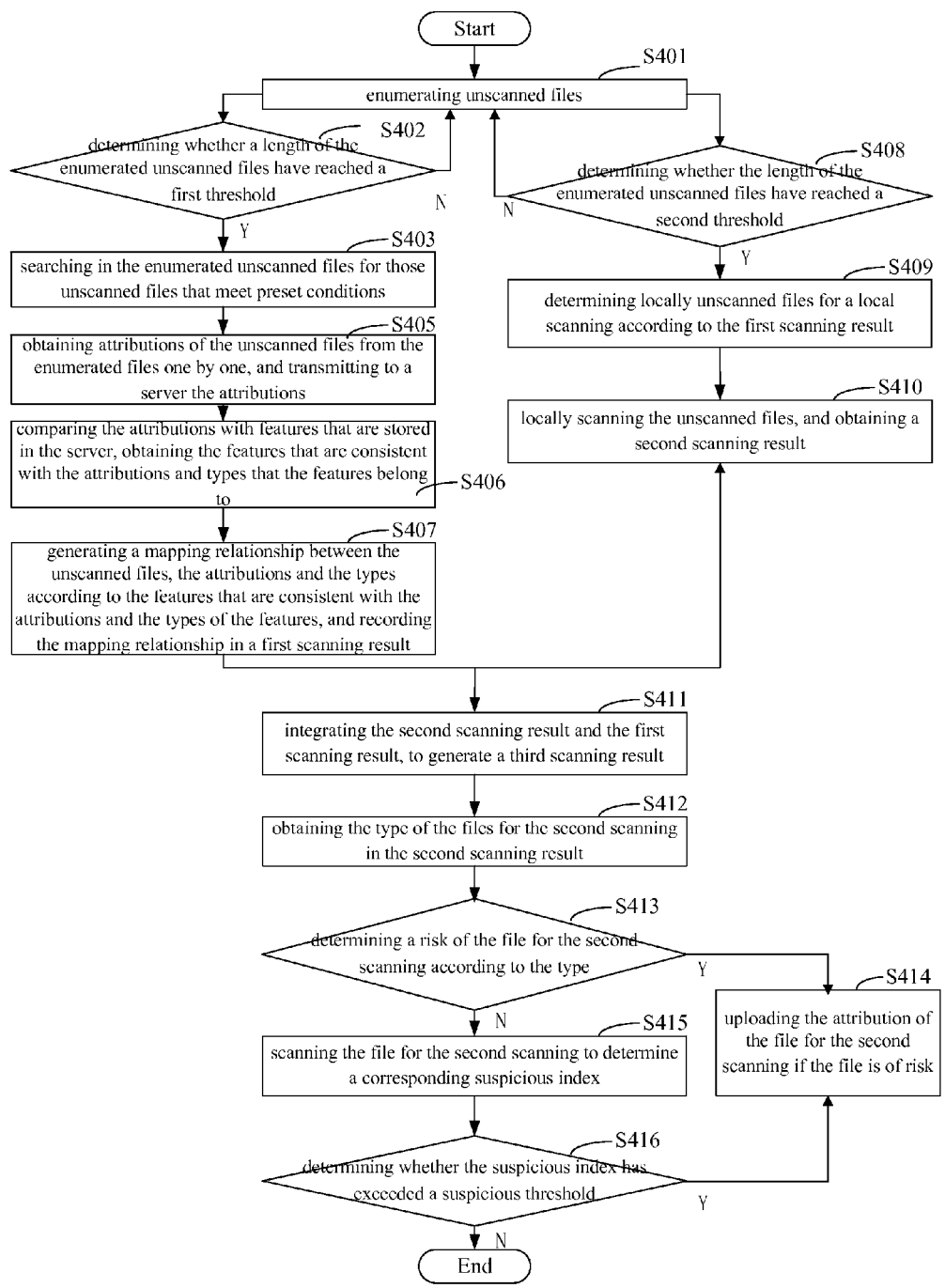
FIG. 4 is a flow diagram of a method for scanning files according to another embodiment.

According to another embodiment, with reference to FIG. 4, the method for scanning files includes steps as follows.

Step S401, enumerating unscanned files.

Step S402, determining whether the length of the enumerated unscanned files have reached a first threshold; step S403 is followed if reached, or step S401 is followed back.

According to the present embodiment, during the process of enumerating the unscanned files to generate the enumerated queue, the length of the generated enumerated queue is determined to see if a first threshold has been reached; the server is triggered to scan the files if it is reached. In a preferred embodiment, the first threshold could be 50, which means that the server would be triggered to scan the files when 50 unscanned files have been enumerated.

Step S403, searching in the enumerated unscanned files for those unscanned files that meet preset conditions.

In the present embodiment, after triggering the server to scan the files, the multiple enumerated files are searched for those unscanned files that could be scanned through the server. In a preferred embodiment, the preset condition could be PE (portable execute) files with the size less than 3M. The preset conditions could be modified according to the actual processing capacity and the user demands.

Step S405, obtaining the attributions one by one from the enumerated unscanned files, and send the attributions to the server.

Step S406, comparing the attributions with the features stored in the server, and obtaining features that are consistent with the attributions and the types of the features.

Step S407, generating a mapping relationship of the unscanned files, the attributions, and the types according to the features that are consistent with the attributions and the types of the features, and recording the mapping relationship into a first scanning result.

Step S408, determining whether the length of the enumerated unscanned files have reached a second threshold; step S409 is followed if it is reached or step S401 is followed back.

According to the present embodiment, with the process of enumerating the unscanned files to generate the enumerated queue, the length of the enumerated queue is determined to see if a preset second threshold is reached; the local scanning is triggered if it is reached. In accordance with a preferred embodiment, the second threshold could be 5000, which means that the local scanning would be triggered after the length of the enumerated queue has reached 5000.

In a preferred embodiment, the second threshold shall be larger than the first threshold, due to the fact that the file scanning in the server would require network connection and data transmission which relatively consuming more time as compared to that of the local scanning Moreover, the features stored in the server would be more adequate, it would improve the accuracy of the scanning if the final scanning result is concluded on basis of the first scanning result that is generated through the server scanning, while the total scanning time would be saved as such.

Step S409, determining the files for local scanning according to the first scanning result.

In a detailed embodiment, it is included after the above step S405 the step of tagging the unscanned files that have transmitted the attributions.

In the embodiment, after the attributions of the files are transmitted to the server, tagging the files that are scanned through the server.

Figure 5:
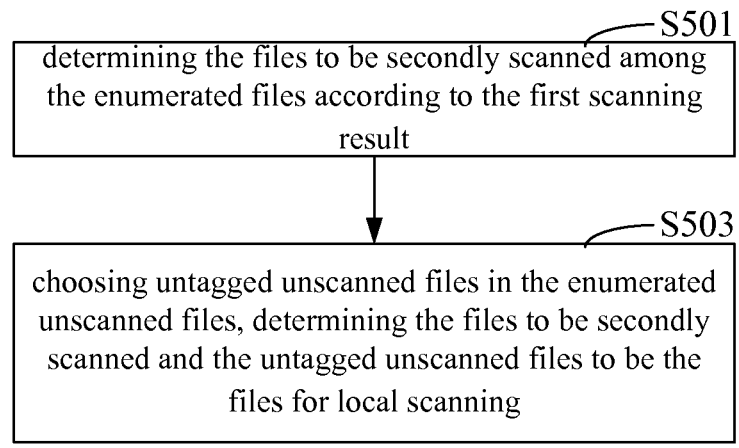
FIG. 5 is a flow diagram of the method for locally scanning the unscanned files according to a first scanning result of FIG. 4.

Referring to FIG. 5, the details of the above step S409 includes as follows.

Step S501, determining the files to be secondly scanned among the enumerated files according to the first scanning result.

In the current embodiment, the files and the corresponding type of the files are determined through the first scanning result, if the type of the file recorded in the first scanning result is gray list or undefined, which indicates that the files might be suspicious files or the attributions of which could not be found corresponding features stored in the server that are consistent therewith, and thereby could not be determined while need to be secondly scanned.

Step S503, choosing the untagged unscanned files in the enumerated unscanned files, determining the files to be secondly scanned and the untagged unscanned files to be the files for local scanning In the present embodiment, those files within the enumerated multiple unscanned files that have not been server scanned shall be scanned through the local scanning engine as well.

Step S410, scanning the determined files for local scanning with the local scanning engine, and generating a second scanning result.

In the present embodiment, the detailed process for locally scanning the determined unscanned files and generating the second scanning result would be: successively scanning the files for second scanning and the untagged files according to the preset priority.

During the process for successively scanning the files according to the preset priority, the files for second scanning are locally scanned first, after the scanning on the files for second scanning is finished, the files that are not PE files are scanned, and finally the PE files that are not qualified for the preset conditions are scanned. The priority for the scanning can be adjusted accordingly.

Step S411, integrating the second scanning result with the first scanning result to generate a third scanning result.

Step S412, obtaining the type of the files for the second scanning in the second scanning result.

According to the present embodiment, since it is recorded in the second scanning result the relationship between the file names, the attributions, and the types, it could be found from the second scanning result thereby the type of the files that have gone through the second scanning; and accordingly the files for the second scanning could thereby be determined whether to be the virus file or the Trojans according to the type.

Step S413, determining the risk of the file for the second scanning according to the type, step S414 is followed if it is risky, or step S415 is followed if not.

In the present embodiment, it can be determined whether the files for the second scanning are risky according to the corresponding type. For instance, if the type thereof is the blacklist, it is indicated that the file for the second scanning contains virus or Trojans, thereby is risky. Since the type of the risky file is determined through the local scanning, it is indicated that the features stored in the server is inadequate while need to be updated; whereas the attribution of the file with the type determined in the second scanning is stored as a feature.

Step S414, uploading the attribution of the file for the second scanning.

Step S415, scanning the file for the second scanning to determine a corresponding suspicious index.

According to the present embodiment, when it is determined that the type of the file for the second scanning is not risky, the file for the second scanning might be a suspicious file, while it is needed to scan this file for determining its corresponding suspicious index.

Step S416, determining whether the suspicious index has exceeded a suspicious threshold, step S414 is followed back if it has exceeded, or goes to the end if no.

According to the present embodiment, it is possible to determine the safety possibility of the suspicious file according to the preset suspicious threshold. For instance, the suspicious threshold is set to be 30%; if the suspicious index exceeds 30%, the suspicious file shall be determined to be a virus file or Trojans file; as long as the feature of the suspicious file is not stored in the server, it is needed to upload the feature of the suspicious file to the server, and classify into the blacklist.

Figure 6:
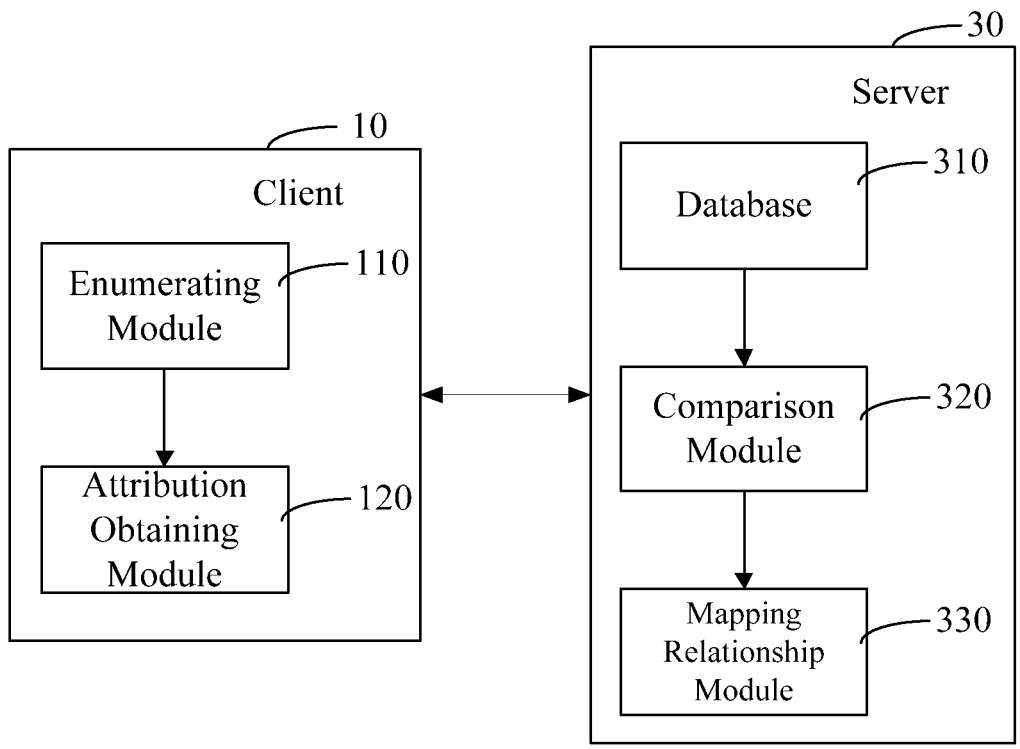
FIG. 6 is a block diagram of a system for scanning files according to an embodiment.

FIG. 6 is a block diagram of a system for scanning files according to an embodiment, which system includes a client 10 and a server 30.

The client 10 includes one or more client processors, and a client memory storing computer-executable client codes executable at the one or more client processors. In one embodiment, the client codes an enumerating module 110 and an attribution obtaining module 120.

The enumerating module 110 is used for enumerating files.

According to the current embodiment, when launching the scanning engine of the anti-virus software or anti-Trojans software, the users create a scanning request through the scanning page of the scanning engine, and send the created scanning request to the bottom hardware of the system through an IPC (inter-process communication) module, and further send the scanning request to the server through the bottom hardware of the system. The scanning engine and the server obtain the unscanned files through the received scanning request, and thereby carry targeted scanning on the files according to the scanning request. The IPC module is set between the scanning page of the scanning engine and the bottom hardware, for conducting a communication between the scanning page and the bottom hardware, and further getting the scanning engine and the server interconnected.

In detail, the scanning request includes a task ID, scanning layer, and the way to enumerate the file folder; wherein the scanning layer is related to the options that the user chooses to make a quick scanning, a complete scanning, or a customized scanning. For example, as in the mode of quick scanning, the scanning speed is quite high while the scanning layer is relatively superficial.

For conducting the scanning of the files, the unscanned files would be obtained according to the user's operation on the scanning page. The designated files would be the unscanned files, and then are enumerated in accordance with a set queue length, distributed to be enumerated queues with particular length for the canning. In a preferred embodiment, the length of the files is 20000.

The attribution obtaining module 120 is used for obtaining the attribution of the unscanned files one by one, and transmitting to the server the attributions.

According to the current embodiment, the attribution obtaining module 120 obtains the attributions of the unscanned files to identify the unscanned files uniquely, which attributions could be used for ensuring the integrity of the unscanned files. In a preferred embodiment, the attributions of the unscanned files could be MD5 value.

The attribution obtaining module 120 obtains the attribution of each unscanned file of the enumerated multiple unscanned files one by one, to generate an inquiry request containing information such as the attribution, the file name of the unscanned file; the generated inquiry request is then sent to the server. The server could be a cloud platform constructed by multiple servers within which cloud platform the number of the servers could be added or deducted with reference to the demand, or large scale server groups.

After triggering the scanning of the server on the files, if the enumerated unscanned files to be scanned by the server are void which no unscanned file is found to be scanned by the server, a predetermined time is set and to be waited before a retry. The predetermined time could be 100 ms.

The server 30 includes a database 310, one or more server processors; and a server memory storing computer-executable server codes executable at the one or more server processors. In one embodiment, the server codes comprises a comparison module 320, and a mapping relationship module 330.

The database 310 is used for storing features and the types of the features.

The comparison module 320 is used for comparing the attribution with the features that are stored, and obtaining those features that are consistent with the attributions and the type that the features belong to.

In the current embodiment, the attributions might be the MD5 values or Hash values after conducting calculations on the unscanned files, wherein each attribution is corresponding to one unscanned file uniquely. In case that the unscanned file is of no integrity, the corresponding attribution would be different from that of the integrated unscanned file. Large number of features and the belonging types are stored in the server. The comparison module 320 looks up in the server according to the attributions of the unscanned files, to find those features that are consistent with the attributions, and moreover to find the type that the features belong to according to the correlation between the features and the corresponding types, wherein the found types are the types of the attributions of the unscanned files indicating that the unscanned files are normal files, virus files, or Trojans. For instant, the types that the features of the virus files belong are blacklists, those files with the blacklist types are virus files or Trojans; while the types that the features of the normal files belong are whitelists, those files with the whitelist types are determined to be safe files that don't contain viruses or Trojans and are trustworthy to run. For suspicious files, the types of which are gray list; while those files with the gray list type could not be determined as virus files or Trojans, but are active in the virus sensitive parts of the system.

The comparison module 320 finds those features that are consistent with the attributions of the unscanned files among the comparison of the attributions with the features that are stored in the server, and further the corresponding types are determined through the features that are consistent with the attributions. The types indicate that the files corresponding to the attribution is virus files, Trojans, or normal files, or suspicious files. In case that there is not stored in the server the consistent feature in accordance with the attribution, meaning the large amount of features stored in the server are not hit, whereas the files with such attributions are classified into an undefined list.

The mapping relationship module 330 is used for generating a mapping relationship between the unscanned files, the attributions and the types according to the features that are consistent with the attributions and the types of the features, and recording the mapping relationship in a first scanning result.

According to the current embodiment, the mapping relationship module 330 determines the type of the file through the comparison process between the attribution and the feature, and further a first scanning result is concluded and sent to the user.

Figure 7:
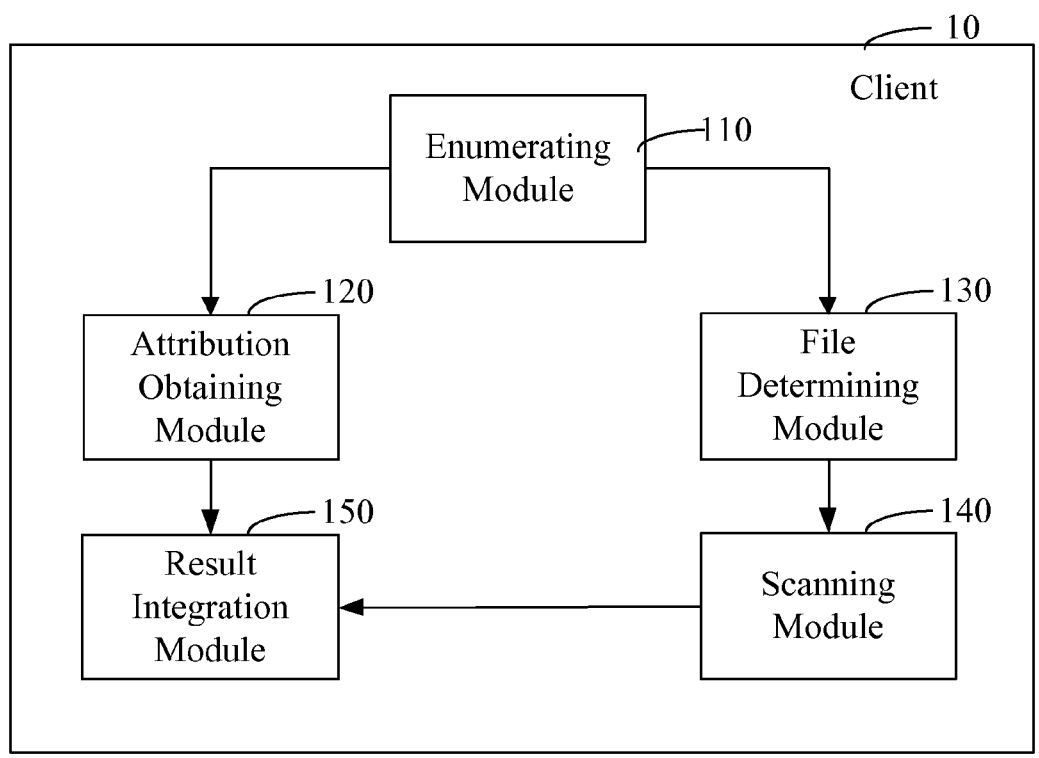
FIG. 7 is a block diagram of a client according to an embodiment.

According to another embodiment, referring to FIG. 7, the client 10 includes, in addition to the enumerating module 110 and the attribution obtaining module 120, a file determining module 130, a scanning module 140, and a result integration module 150.

The file determining module 130 is used for determining locally unscanned files for the local scanning according to the first scanning result.

In accordance with the current embodiment, on the basis of the scanning through the server, the files could also go through a local scanning with the scanning engine. For the improvement of the efficiency and the accuracy, the local scanning of the files shall be made with adequate combination with the file scanning in the server.

In detail, the file determining module 130 can determine from the first scanning result that is fed back from the server those suspicious files and those files with attributions that corresponding features could not be found in the server, wherein for ensuring the accuracy of the scanning result, it is necessary to determine the suspicious files and the files with the undefined list to be the scanning files for the local scanning Further, it is necessary for the file determining module 130 to enable a local scanning on those files that have not gone through the scanning in the server, thereby ensuring all the files have been scanned and obtained corresponding scanning result.

After triggering the local scanning, if the unscanned files for the local scanning are not found, a predetermined time is set to be waited before a retry. The predetermined time could be 100 ms.

In a detailed embodiment, the above client includes also a tagging module; the tagging module is used for tagging those files that have transmitted the attributions.

In the present embodiment, the tagging module tags the files that are scanned through the server after transmitted the attributions to the server.

Figure 8:
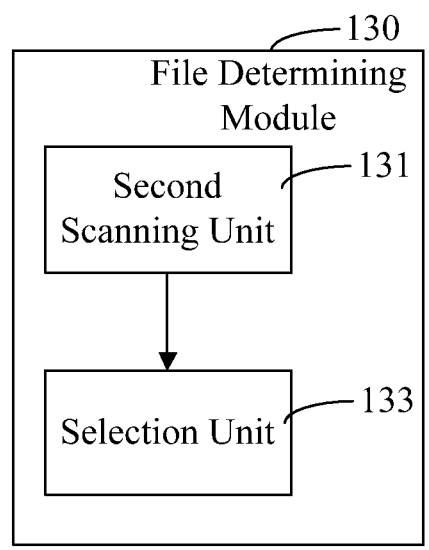
FIG. 8 is a block diagram of the file determining module of FIG. 7.

Referring to FIG. 8, the file determining module 130 includes a second scanning unit 131 and a selection unit 133.

The second scanning unit 131 is used for determining the files to be secondly scanned among the enumerated files according to the first scanning result.

In the current embodiment, the second scanning unit 131 determines the files and the corresponding type of the files through the first scanning result, if the type of the file recorded in the first scanning result is gray list or undefined, which indicates that the files might be suspicious files or the attributions of which could not be found corresponding features stored in the server that are consistent therewith, and thereby could not be determined while need to be secondly scanned.

The selection unit 133 is used for choosing the untagged unscanned files in the enumerated unscanned files, determining the files to be secondly scanned and the untagged unscanned files to be the files for local scanning.

In the present embodiment, those files within the enumerated multiple unscanned files that have not been server scanned shall be scanned through the local scanning engine as well.

The scanning module 140 is used for scanning the determined files for local scanning with the local scanning engine, and generating a second scanning result.

According to the current embodiment, the scanning module 140 obtains the attributions from the unscanned files, and looks up the local virus library to find the features that are consistent with the attributions and the corresponding type according to the obtained attribution, and further, whether the files are normal files, virus files or Trojans could be determined by the found type.

In detail, the scanning module 140 is used also for successively scanning the files for second scanning and the untagged files according to the preset priority.

During the process for successively scanning the files according to the preset priority, the scanning module 140 locally scans the files for second scanning first, after the scanning on the files for second scanning is finished, the files that are not PE files are scanned, and finally the PE files that are not qualified for the preset conditions are scanned. The priority for the scanning can be adjusted accordingly.

The result integration module 150 is used for integrating the second scanning result with the first scanning result to generate a third scanning result.

According to the current embodiment, after finished the server scanning and the local scanning, a third scanning result could be determined through the integration of the first scanning result and the second scanning result with adequate combination by the result integration module 150.

Figure 9:
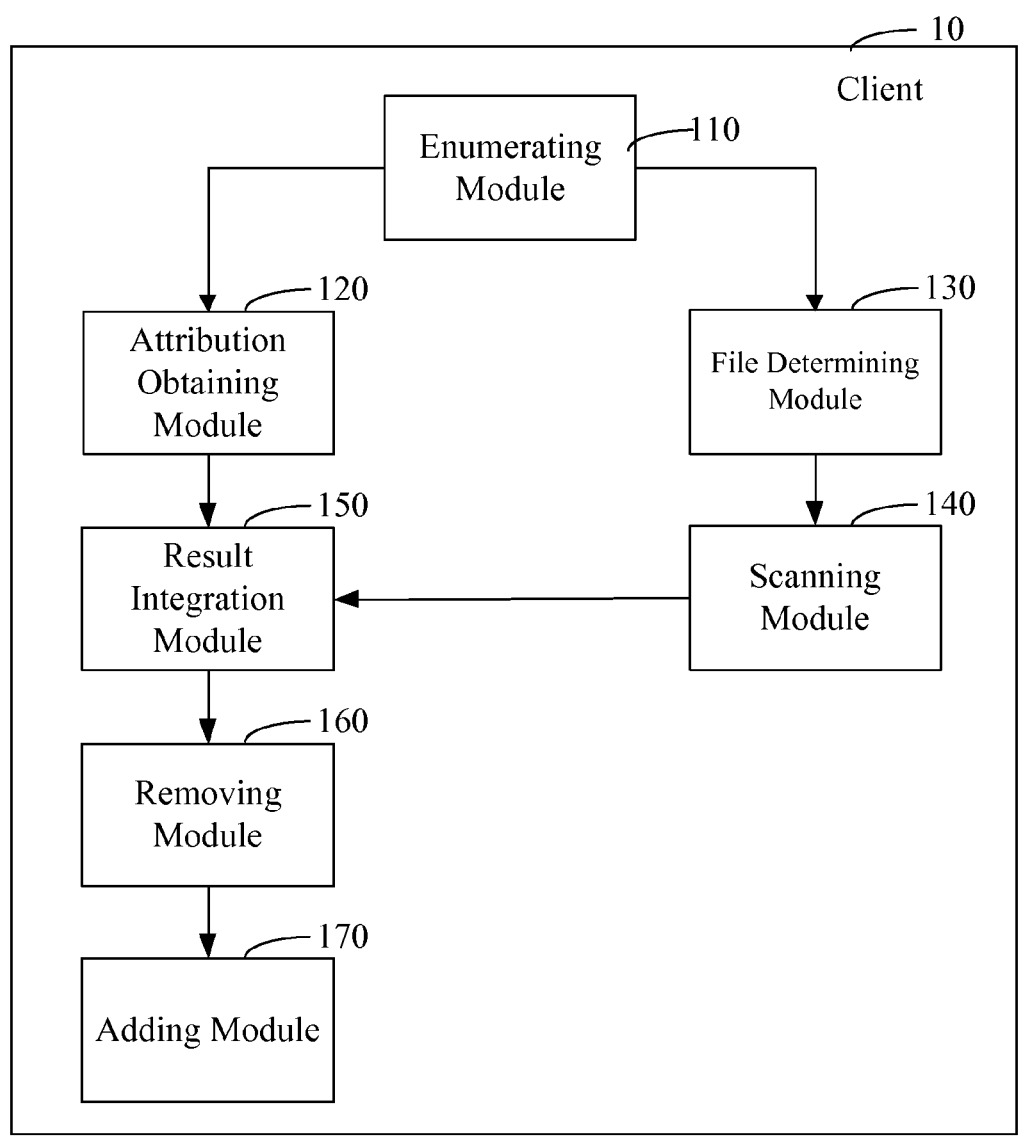
FIG. 9 is a block diagram of the client according to another embodiment.

According to another embodiment, referring to FIG. 9, the above client 10 includes also a removing module 160 and an adding module 170.

The removing module 160 is used for removing the unscanned files corresponding to the files in the third scanning result from the enumerated queue.

In the present embodiment, after the server scanning and the local scanning on the files, the removing module 160 shall remove those files that have gone through the scanning from the enumerated queues; which means the files are addressed according to the file options in the third scanning result, and then removed from the enumerated multiple scanning files.

The adding module 170 is used for determining whether there is blank in the enumerated queue, adding unscanned files that are not included in the enumerated queue into the enumerated queue if there is blank.

According to the present embodiment, not all the unscanned files are within the enumerated queue since the enumerated multiple files shall form the enumerated queue with a particular length, therefore it is necessary for the adding module 170 to find the blank in the enumerated queue so that those files that have not been included in the enumerated queue could be added into the enumerated queue.

In detail, after removing the files that have been scanned, the unscanned files in the enumerated queue would remain the original positions while would not be moved or adjusted even particular files have been removed. For instance, if a file in the first position in the enumerated queue is removed from the enumerated queue after being scanned, the file in the second position would not move forward to supplement the blank in the first position. Accordingly, an enumerating pointer in the enumerated queue would start to search for the blank from the first position, while a blank is found; the adding module 170 would add an unscanned file which is not included in the enumerated queue and waiting for being scanned into the enumerated queue. In case no blank is found, a continued search is gone through for adding the unscanned file into the enumerated queue.

Figure 10:
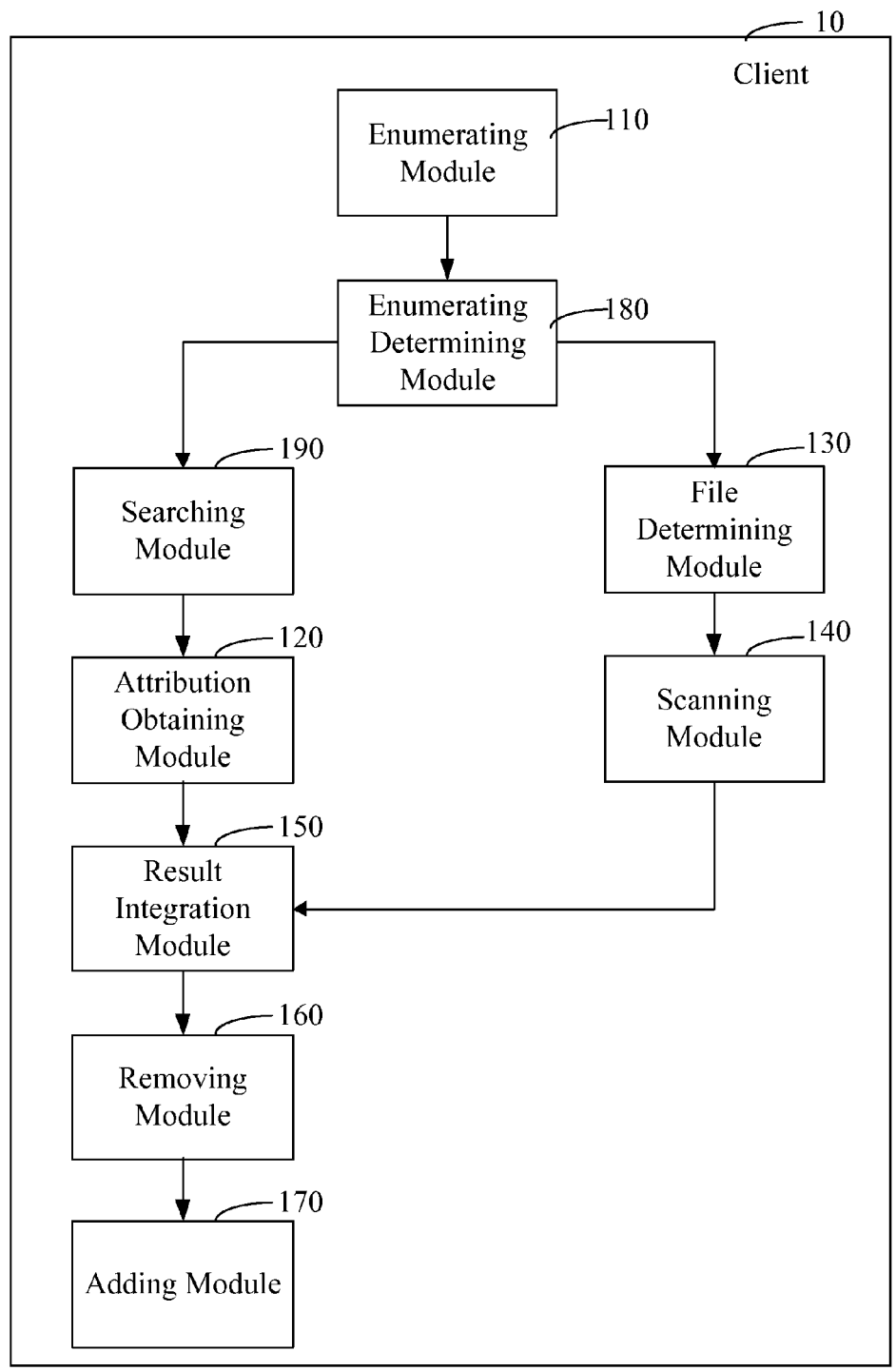
FIG. 10 is a block diagram of the client according to another embodiment.

According to another embodiment, referring to FIG. 10, the client 10 includes also an enumerating determining module 180 and a searching module 190.

The enumerating determining module 180 is used for determining whether the length of the enumerated unscanned files have reached a first threshold; and informing the searching module 190 if it is reached.

According to the present embodiment, during the process of enumerating the unscanned files to generate the enumerated queue, the enumerating determining module 170 determines the length of the generated enumerated queue to see if a first threshold has been reached; the server is triggered to scan the files if it is reached. In a preferred embodiment, the first threshold could be 50, which means that the server would be triggered to scan the files when 50 unscanned files have been enumerated.

The searching module 190 is used for searching in the enumerated unscanned files for those unscanned files that meet preset conditions.

In the present embodiment, after trigging the server to scan the files, the searching module 190 searches the multiple enumerated files for those unscanned files that could be scanned through the server. In a preferred embodiment, the preset condition could be PE (portable execute) files with the size less than 3M. The preset conditions could be modified according to the actual processing capacity and the user demands.

The enumerating determining module 180 is also used for determining whether the length of the enumerated unscanned files have reached a second threshold, and informing the file determining module 130 if it is reached.

According to the present embodiment, with the process of enumerating the unscanned files to generate the enumerated queue, the enumerating determining module 180 determines the length of the enumerated queue to see if a preset second threshold is reached; the local scanning is triggered if it is reached. In accordance with a preferred embodiment, the second threshold could be 5000, which means that the local scanning would be triggered after the length of the enumerated queue has reached 5000.

In a preferred embodiment, the second threshold shall be larger than the first threshold, due to the fact that the file scanning in the server would require network connection and data transmission which relatively consuming more time as compared to that of the local scanning Moreover, the features stored in the server would be more adequate, it would improve the accuracy of the scanning if the final scanning result is concluded on basis of the first scanning result that is generated through the server scanning, while the total scanning time would be saved as such.

Figure 11:
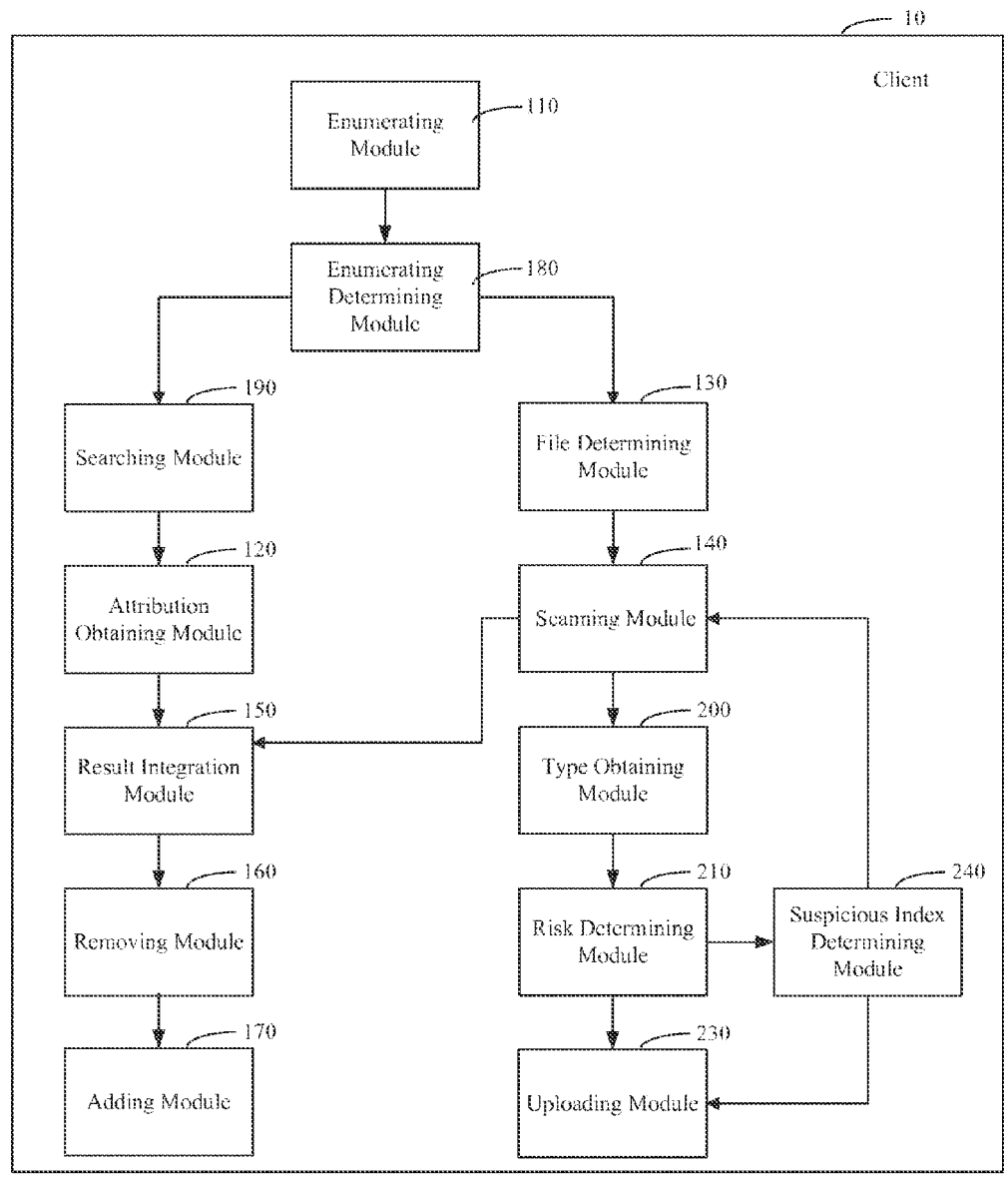
FIG. 11 is a block diagram of the client according to another embodiment.

According to another embodiment, with reference to FIG. 11, the client 10 includes a type obtaining module 200, a risk determining module 210, an uploading module 230, and a suspicious index determining module 240.

The type obtaining module 200 is used for obtaining the type of the files for the second scanning in the second scanning result.

According to the present embodiment, since it is recorded in the second scanning result the relationship between the file names, the attributions, and the types, the type obtaining module 200 could thereby find from the second scanning result the type of the files that have gone through the second scanning; and accordingly the files for the second scanning could thereby be determined whether to be the virus file or the Trojans according to the type.

The risk determining module 210 is used for determining the risk of the file for the second scanning according to the type; informing the uploading module 230 if it is risky, or informing the scanning module 140 if not.

In the present embodiment, the risk determining module 210 can determine whether the files for the second scanning are risky according to the corresponding type. For instance, if the type thereof is the blacklist, it is indicated that the file for the second scanning contains virus or Trojans, thereby is risky. Since the type of the risky file is determined through the local scanning, it is indicated that the features stored in the server is inadequate while need to be updated; whereas the attribution of the file with the type determined in the second scanning is stored as a feature.

The uploading module 230 is used for uploading the attribution of the file for the second scanning.

The scanning module 140 is also used for scanning the file for the second scanning to determine a corresponding suspicious index.

According to the present embodiment, when it is determined that the type of the file for the second scanning is not risky, the file for the second scanning might be a suspicious file, while it is needed for the scanning module 140 to scan this file for determining its corresponding suspicious index.

The suspicious index determining module 240 is used for determining whether the suspicious index has exceeded a suspicious threshold; and informing the uploading module 230 if it has exceeded.

According to the present embodiment, it is possible to determine the safety possibility of the suspicious file according to the preset suspicious threshold. For instance, the suspicious threshold is set to be 30%; if it is determined by the suspicious index determining module 240 that the suspicious index exceeds 30%, the suspicious file shall be determined to be a virus file or Trojans file; as long as the feature of the suspicious file is not stored in the server, it is needed to upload the feature of the suspicious file to the server, and classify into the blacklist.

The above method and system for scanning files and the client and the server upload the attributions of the files to the server; and make the safety and risky recognition of the file through comparing with the features and the corresponding types. Since the server would break the limit of the storage volume while storing large amount of features and the server could update the features quickly and timely, the features stored in the server would be relatively competent; thereby the scanning efficiency of the files could be improved.

The above method, system, client and server for scanning files integrate the scanning on the files through the local scanning and the server scanning of the comparison of the features, whereas the scanning accuracy is improved.

The above method, system, client and server for scanning files upload the risky files or the secondly scanned files with suspicious index exceeding the suspicious threshold, whereas continuously updates and supplements the features stored in the server, thereby improved the efficiency for scanning the files.

The above described embodiments explain only several exemplary embodiments of the present disclosure. It shall be mentioned that for those skilled in the art, alternative embodiments could be made to which the present disclosure pertains without departing from its spirit and scope, wherein the alternative embodiments shall be defined as within the claim of the current disclosure.

What is claimed is:

1. A method for scanning files, comprising:
   enumerating unscanned files;
   obtaining attributions of the unscanned files from the enumerated files one by one, and transmitting to a server the attributions;
   comparing the attributions with features that are stored in the server, obtaining the features that are consistent with the attributions and types that the features belong to;
   generating a mapping relationship between the unscanned files, the attributions and the types according to the features that are consistent with the attributions and the types of the features, and recording the mapping relationship in a first scanning result;
   determining locally unscanned files for a local scanning according to the first scanning result;
   locally scanning the unscanned files, and obtaining a second scanning result; and
   integrating the second scanning result and the first scanning result, to generate a third scanning result.

2. The method for scanning files according to claim 1, wherein after recording the mapping relationship in the first scanning result, the method further comprises:
   removing the unscanned files corresponding to the files in the third scanning result from an enumerated queue.

3. The method for scanning files according to claim 2, wherein after removing the unscanned files corresponding to the files in the third scanning result from the enumerated queue, the method further comprises:
   determining whether there is blank in the enumerated queue, and adding unscanned files that are not included in the enumerated queue into the enumerated queue if there is blank.

4. The method for scanning files according to claim 1, wherein before obtaining attributions of the unscanned files from the enumerated files one by one, the method further comprises:
   determining whether a length of the enumerated unscanned files have reached a first threshold; and
   searching in the enumerated unscanned files for those unscanned files that meet preset conditions if the length reached the first threshold; and obtaining attributions of the unscanned files from the enumerated files one by one;

wherein before determining locally unscanned files for the local scanning according to the first scanning result, the method further comprises:
  determining whether the length of the enumerated unscanned files have reached a second threshold; and
  determining locally unscanned files for the local scanning according to the first scanning result if the length reached the second threshold.

5. The method for scanning files according to claim 1, wherein after transmitting to the server the attributions, the method further comprises:
  tagging the unscanned files that have transmitted the attributions;
  wherein determining locally unscanned files for a local scanning according to the first scanning result comprises:
  determining the files to be secondly scanned among the enumerated files according to the first scanning result; and
  choosing untagged unscanned files in the enumerated unscanned files, determining the files to be secondly scanned and the untagged unscanned files to be the files for local scanning.

6. The method for scanning files according to claim 5, wherein locally scanning the unscanned files, and obtaining the second scanning result comprises:
  successively scanning the files for second scanning and the untagged files according to a preset priority.

7. The method for scanning files according to claim 1, wherein after integrating the second scanning result and the first scanning result, to generate the third scanning result, the method further comprises:
  obtaining the type of the files for the second scanning in the second scanning result;
  determining a risk of the file for the second scanning according to the type; and uploading the attribution of the file for the second scanning if the file is of risk;
  scanning the file for the second scanning to determine a corresponding suspicious index if the file is not of risk; and
  determining whether the suspicious index has exceeded a suspicious threshold; and uploading the attribution of the file for the second scanning if the suspicious index exceeds the suspicious threshold.

8. A method for scanning files, comprising:
  enumerating unscanned files;
  obtaining attributions of the unscanned files from the enumerated files one by one, and transmitting to a server the attributions;
  determining files for local scanning according to the first scanning result fed back from the server;
  locally scanning the determined files for local scanning, and generating a second scanning result;
  integrating the second scanning result with the first scanning result to generate a third scanning result; and
  removing the unscanned files corresponding to the files in the third scanning result from an enumerated queue.

9. The method for scanning files according to claim 8, wherein after removing the unscanned files corresponding to the files in the third scanning result from the enumerated queue, the method further comprises:
  determining whether there is blank in the enumerated queue; and adding unscanned files that are not included in the enumerated queue into the enumerated queue if there is blank.

10. The method for scanning files according to claim 8, wherein before obtaining attributions of the unscanned files from the enumerated files one by one, the method further comprising:
  determining whether a length of the enumerated unscanned files have reached a first threshold; and
  searching in the enumerated unscanned files for those unscanned files that meet preset conditions if the length reached the first threshold; and obtaining attributions of the unscanned files from the enumerated files one by one;
  wherein before determining locally unscanned files for a local scanning according to the first scanning result, the method further comprises:
  determining whether the length of the enumerated unscanned files have reached a second threshold; and
  determining locally unscanned files for a local scanning according to the first scanning result if the length reached the second threshold.

11. The method for scanning files according to claim 8, wherein after transmitting to the server the attributions, the method further comprises:
  tagging the unscanned files that have transmitted the attributions;
  wherein determining locally unscanned files for a local scanning according to the first scanning result comprises:
  determining the files to be secondly scanned among the enumerated files according to the first scanning result; and
  choosing untagged unscanned files in the enumerated unscanned files, determining the files to be secondly scanned and the untagged unscanned files to be the files for local scanning.

12. The method for scanning files according to claim 11, wherein locally scanning the unscanned files, and obtaining the second scanning result comprises:
  successively scanning the files for second scanning and the untagged files according to a preset priority.

13. The method for scanning files according to claim 8, wherein after integrating the second scanning result and the first scanning result, to generate the third scanning result, the method further comprises:
  obtaining the type of the files for the second scanning in the second scanning result;
  determining a risk of the file for the second scanning according to the type; and
  uploading the attribution of the file for the second scanning if the file is of risk;
  scanning the file for the second scanning to determine a corresponding suspicious index if the file is not of risk; and
  determining whether the suspicious index has exceeded a suspicious threshold; and uploading the attribution of the file for the second scanning if the suspicious index exceeds the suspicious threshold.

14. A system for scanning files, comprising a client and a server;
  wherein the client comprises:
  one or more client processors; and
  a client memory storing computer-executable client codes executable at the one or more client processors, wherein the client codes comprises:
  an enumerating module for enumerating files;
  an attribution obtaining module for obtaining attributions of unscanned files one by one, and transmitting to the server the attributions;

a file determining module for determining locally unscanned files for the local scanning according to the first scanning result;

a scanning module for locally scanning the determined files for local scanning, and generating a second scanning result; and a result integration module for integrating the second scanning result with the first scanning result to generate a third scanning result, and wherein the server comprises:

a database for storing features and the types of the features;

one or more server processors; and a server memory storing computer-executable server codes executable at the one or more server processors, wherein the server codes comprises:

a comparison module for comparing the attribution with the features that are stored, and obtaining those features that are consistent with the attributions and the type that the features belong to; and a mapping relationship module for generating a mapping relationship between the unscanned files, the attributions and the types according to the features that are consistent with the attributions and the types of the features, and recording the mapping relationship in a first scanning result.

15. The system for scanning files according to claim 14, wherein the client codes further comprises:

a removing module for removing the unscanned files corresponding to the files in the third scanning result from the enumerated queue.

16. The system for scanning files according to claim 15, wherein the client codes further comprises:

an adding module for determining whether there is blank in the enumerated queue, and adding unscanned files that are not included in the enumerated queue into the enumerated queue if there is blank.

17. The system for scanning files according to claim 14, wherein the client codes further comprises:

an enumerating determining module for determining whether a length of the enumerated unscanned files have reached a first threshold; and informing a searching module if it is reached; and a searching module for searching in the enumerated unscanned files for those unscanned files that meet preset conditions;

wherein the enumerating determining module is further used for determining whether the length of the enumerated unscanned files have reached a second threshold, and informing the file determining module if it is reached.

18. The system for scanning files according to claim 14, wherein the client codes further comprises:

a tagging module for tagging the files that have transmitted the attributions;

wherein the file determining module further comprises:

a second scanning unit for determining the files to be secondly scanned among the enumerated files according to the first scanning result; and a selection unit for choosing the untagged unscanned files in the enumerated unscanned files, determining the files to be secondly scanned and the untagged unscanned files to be the files for local scanning.

19. The system for scanning files according to claim 18, wherein the scanning module is further used for successively scanning the files for second scanning and the untagged files according to the preset priority.

20. The system for scanning files according to claim 14, wherein the client codes further comprises:

a type obtaining module for obtaining the type of the files for the second scanning in the second scanning result;

a risk determining module for determining the risk of the file for the second scanning according to the type; informing an uploading module if it is risky, or informing the scanning module if not;

the uploading module for uploading the attribution of the file for the second scanning;

the scanning module is further used for scanning the file for the second scanning to determine a corresponding suspicious index; and a suspicious index determining module for determining whether the suspicious index has exceeded a suspicious threshold; and informing the uploading module if it has exceeded.

21. A client for scanning files, comprising:

one or more client processors; and a client memory storing computer-executable client codes executable at the one or more client processors, wherein the client codes comprises:

an enumerating module for enumerating files;

an attribution obtaining module for obtaining attributions of unscanned files one by one, and transmitting to the server the attributions;

a file determining module for determining locally unscanned files for the local scanning according to the first scanning result;

a scanning module for locally scanning the determined files for local scanning, and generating a second scanning result;

a result integration module for integrating the second scanning result with the first scanning result to generate a third scanning result; and a removing module for removing the unscanned files corresponding to the files in the third scanning result from the enumerated queue.

22. The client for scanning files according to claim 21, wherein the client codes further comprises:

an adding module for determining whether there is blank in the enumerated queue, and adding unscanned files that are not included in the enumerated queue into the enumerated queue if there is blank.

23. The client for scanning files according to claim 21, wherein the client codes further comprises:

an enumerating determining module for determining whether a length of the enumerated unscanned files have reached a first threshold; and informing a searching module if it is reached; and a searching module for searching in the enumerated unscanned files for those unscanned files that meet preset conditions;

wherein the enumerating determining module is further used for determining whether the length of the enumerated unscanned files have reached a second threshold, and informing the file determining module if it is reached.

24. The client for scanning files according to claim 21, wherein the client codes further comprises:

a tagging module for tagging the files that have transmitted the attributions;

wherein the file determining module further comprises:

a second scanning unit for determining the files to be secondly scanned among the enumerated files according to the first scanning result; and a selection unit for choosing the untagged unscanned files in the enumerated unscanned files, determining the files to be secondly scanned and the untagged unscanned files to be the files for local scanning.

25. The client for scanning files according to claim 24, wherein the scanning module is further used for successively scanning the files for second scanning and the untagged files according to the preset priority.

26. The client for scanning files according to claim 21, wherein the client codes further comprises:
- a type obtaining module for obtaining the type of the files for the second scanning in the second scanning result;
- a risk determining module for determining the risk of the file for the second scanning according to the type; informing an uploading module if it is risky, or informing the scanning module if not;
- the uploading module for uploading the attribution of the file for the second scanning;
- the scanning module is further used for scanning the file for the second scanning to determine a corresponding suspicious index; and
- a suspicious index determining module for determining whether the suspicious index has exceeded a suspicious threshold; and informing the uploading module if it has exceeded.

* * * * *